UNITED STATES PATENT OFFICE.

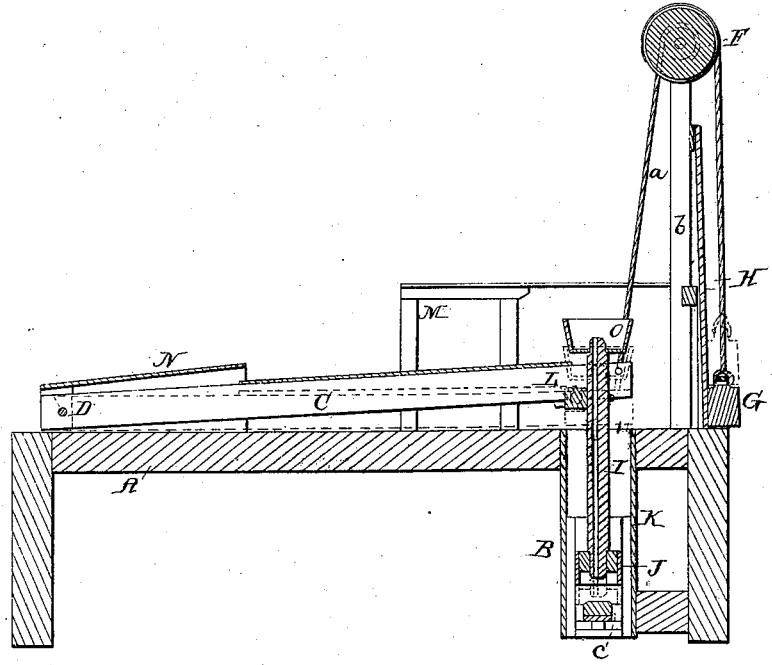

J. F. BLACK AND AMBROSE BURACKER, OF LANCASTER, ILLINOIS.

IMPROVEMENT IN CATTLE-PUMPS.

Specification forming part of Letters Patent No. 36,203, dated August 19, 1862.

*To all whom it may concern:*

Be it known that we, J. F. BLACK and AMBROSE BURACKER, of Lancaster, in the county of Cass and State of Illinois, have invented a new and Improved Pump, of that class commonly termed "stock-pumps," by which animals are enabled to pump up or raise water for their own drinking purposes; and we do hereby declare that the following is a full, clear, and exact description of the same, reference being had to the accompanying drawings, making a part of this specification, in which—

Figure 1 is a side sectional view of our invention, taken in the line *x x*, Fig. 2. Fig. 2 is a plan or top view of the same.

Similar letters of reference indicate corresponding parts in the two figures.

This invention consists in attaching a tubular piston-rod of a pump to a platform which works on a joint at one end and is provided with a water-trough and placed within a guard or railing at its free or disengaged end, and covered at its opposite end, all being arranged substantially as hereinafter fully shown and described, whereby it is believed that a very simple and efficient pump is obtained for the desired purpose.

To enable those skilled in the art to fully understand and construct our invention, we will proceed to describe it.

A represents a platform or the surface of the ground at the top of the well B, and C is a platform one end of which is fitted loosely on a rod, D, and is allowed to work freely thereon, the opposite end of said platform being connected by ropes or chains *a a* to a shaft, E, the journals of which are fitted in the upper parts of two uprights, *b b*. On the shaft E there is placed a pulley, F, to which a weight, G, is attached by a rope, H.

To the platform C, near where the ropes or chains *a a* are connected, there is attached a tubular rod, I, having a piston, J, at its lower end, which is fitted in a cylinder, K, placed vertically in the well B. The rod I passes through the piston J, so that the interior of the former may communicate with the interior of the cylinder below the piston. The bottom of the cylinder K is is provided with a valve, *c*, opening upward. (Shown in Fig. 1.)

The piston-rod I is attached to the platform C as follows: A horizontal bar, L, is secured permanently to the upper part of the piston-rod I, and the ends of the bar L are provided with journals which are fitted in bearings in the platform. The weight G is sufficiently heavy to keep the free or disengaged end of the platform elevated when there is no weight or load upon it.

M is a railing or fence which is placed around the free or disengaged end of the platform C, but not in contact with it, and N is a cover which is placed over the platform at its engaged or connected end, or where the rod D passes through it, said cover being so constructed as to admit of the proper working of the platform underneath it.

On the upper surface of the platform C, at its free or disengaged end, there is permanently secured a trough, O, through which the piston-rod I passes.

The operation is as follows: An animal in passing on the platform C and approaching the trough O will by its own weight depress the platform and thereby force down the piston J, and the water in the cylinder K will be forced up through the rod I into the trough O, out of which the animal drinks. When the animal has passed off from the platform, the latter, by means of the weight G, is elevated, and the piston J rises, the valve *c* in the bottom of cylinder K opening to admit of the latter being filled with water below the piston. On the succeeding descent of the platform by another animal the trough O is again supplied. Thus it will be seen that the animals are enabled to pump or draw up water for their own drinking purposes. The railing M prevents the animals from attempting to get on the platform at an improper point, and also prevents them from gaining access to the trough O except by passing on the platform. The cover N prevents animals from standing on the platform back of the portion occupied by one. Were this allowed the platform might be frequently rendered inoperative, one animal passing on the platform toward the trough while another passes off from it, thereby preventing an ascent of the platform and piston after each animal has been supplied with water. By having the trough O attached to the platform so as to rise and fall with it the animals do not become at all alarmed by the operation of the platform, but will walk thereon and drink their fill from the trough without the least suspicion or fear. The reverse would be the case were the trough attached to a fixture near the platform, as the motion of the latter would then be very apparent.

We do not claim, broadly, a platform arranged so as to rise and fall to operate a pump, for that is an old and well-known device; but We do claim as new and desire to secure by Letters Patent—

1. The platform C with the weight G attached, in combination with the tubular piston-rod I of the pump, and the trough O, attached to the platform, arranged substantially as and for the purpose herein specified.

2. The railing M and cover N, when combined and arranged relatively with the platform C, for the purpose herein set forth.

J. F. BLACK.
A. BURACKER.

Witnesses:
HENRY BEVIS,
WM. MAIN.